US010786994B2

(12) United States Patent
O'Hara et al.

(10) Patent No.: US 10,786,994 B2
(45) Date of Patent: Sep. 29, 2020

(54) WIPING MATERIAL USAGE INDICATORS

(71) Applicant: HEWLETT-PACKARD DEVELOPMENT COMPANY, L.P., Houston, TX (US)

(72) Inventors: Steve A. O'Hara, Vancouver, WA (US); Scott Martin, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/570,892

(22) PCT Filed: Jul. 14, 2015

(86) PCT No.: PCT/US2015/040429
§ 371 (c)(1),
(2) Date: Oct. 31, 2017

(87) PCT Pub. No.: WO2017/010997
PCT Pub. Date: Jan. 19, 2017

(65) Prior Publication Data
US 2018/0290452 A1    Oct. 11, 2018

(51) Int. Cl.
*B41J 2/165*    (2006.01)
*B41J 29/02*    (2006.01)
*G01D 5/06*    (2006.01)

(52) U.S. Cl.
CPC ....... *B41J 2/16535* (2013.01); *B41J 2/16508* (2013.01); *B41J 2/16538* (2013.01); *B41J 2/16547* (2013.01); *B41J 2/16585* (2013.01); *B41J 29/02* (2013.01); *G01D 5/06* (2013.01); *B41J 2002/1655* (2013.01)

(58) Field of Classification Search
None
See application file for complete search history.

(56) References Cited

U.S. PATENT DOCUMENTS

| 5,820,068 A | 10/1998 | Hosomi et al. |
| 6,024,322 A * | 2/2000 | Skelly ..................... B41J 29/48 116/67 A |
| 6,135,384 A | 10/2000 | Skelly |
| 6,502,784 B1 | 1/2003 | Sato |
| 7,507,045 B1 | 3/2009 | Harris et al. |
| 7,553,097 B2 | 6/2009 | Salussolia et al. |
| 2009/0267987 A1 | 10/2009 | Kachi et al. |
| 2011/0057990 A1 | 3/2011 | Heo et al. |
| 2012/0026241 A1 | 2/2012 | Gaston |

(Continued)

FOREIGN PATENT DOCUMENTS

| CN | 1891468 | 1/2007 |
| CN | 102858545 | 1/2013 |

(Continued)

*Primary Examiner* — Alejandro Valencia
(74) *Attorney, Agent, or Firm* — Fabian VanCott

(57) ABSTRACT

A wiping assembly for a fluid ejection device includes a sled slidably movable relative to the fluid ejection device. The wiping assembly further includes a length of wiping material. An indicator slidably coupled to the wiping assembly is included. The indicator changes position relative to the wiping assembly and restricts movement of the wiping assembly to an initial position to indicate a level of usage of the wiping material.

14 Claims, 13 Drawing Sheets

(56) References Cited

U.S. PATENT DOCUMENTS

| | | | |
|---|---|---|---|
| 2012/0224904 A1 | 9/2012 | Nihashi et al. | |
| 2012/0224905 A1 | 9/2012 | Nihashi | |
| 2013/0257979 A1* | 10/2013 | Adachi | B41J 2/16535 |
| | | | 347/33 |
| 2014/0198154 A1 | 7/2014 | O'Hara | |
| 2015/0146120 A1 | 5/2015 | Maida et al. | |
| 2017/0057775 A1* | 3/2017 | Kobs | A47K 10/38 |

FOREIGN PATENT DOCUMENTS

| | | |
|---|---|---|
| DE | 2756334 A1 | 6/1979 |
| KR | 20030040029 | 5/2003 |
| KR | 20040079280 | 9/2004 |
| WO | WO-2014027562 | 2/2014 |

* cited by examiner

WIPING MATERIAL USAGE INDICATORS

BACKGROUND

Printing systems may perform routine maintenance to achieve optimal printing performance within the printing system. For some types of printers, such as those including fluid ejection devices, such maintenance may include spitting and wiping jettable fluid from the nozzles and other areas of the fluid ejection devices. For example, during a service event, a wiping material may be placed in contact with and wipe the nozzles and other areas of the fluid ejection devices. The wiping operation may maintain a health of the fluid ejection devices.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1A:
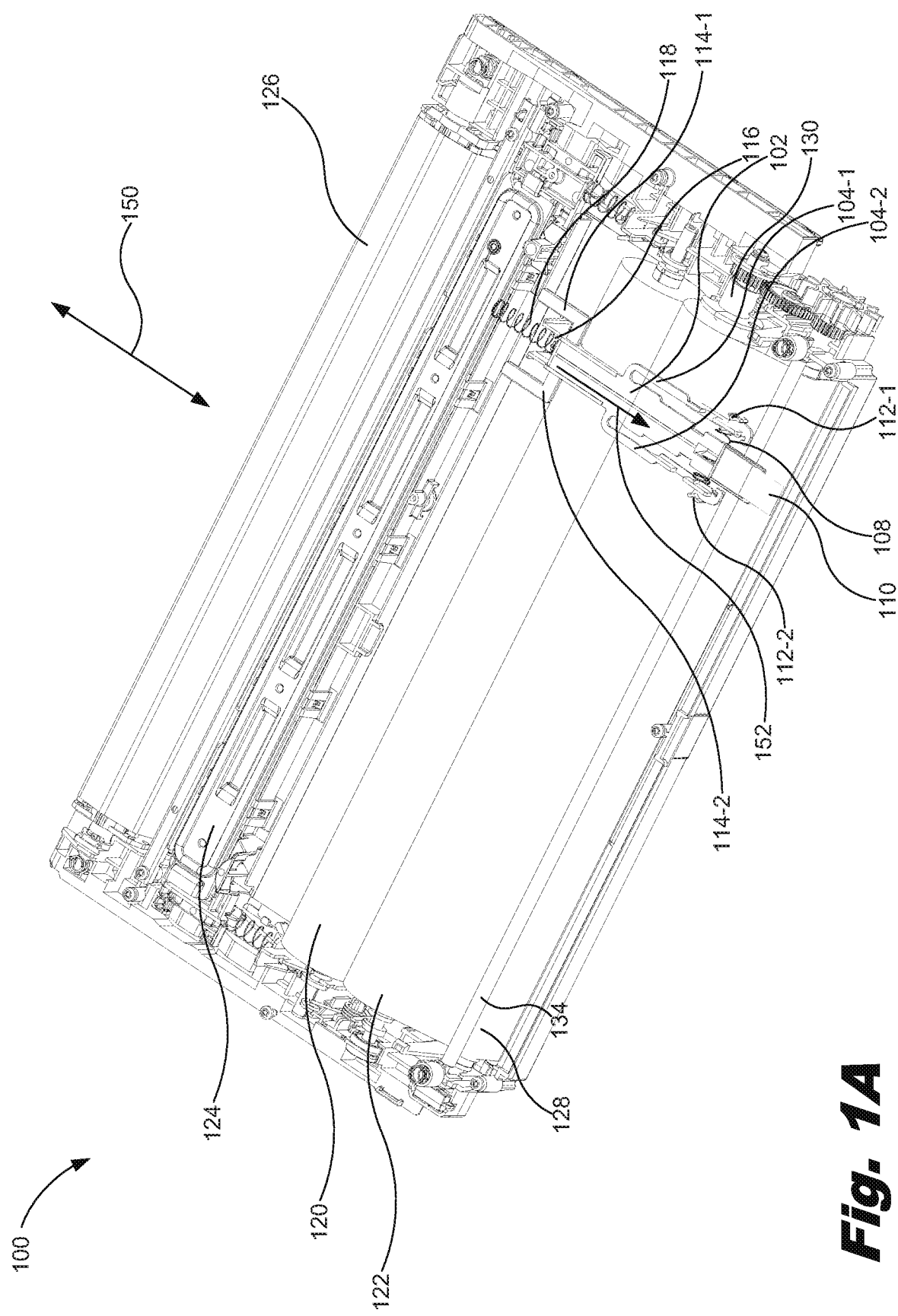
FIG. 1A is a front perspective view of a wiping assembly with a cover removed, according to one example of the principles described herein.

As mentioned above, wiping operations may maintain a health of the fluid ejection devices. However, in some examples, the amount of wiping material remaining in the fluid ejection device is detected by expensive electronic or electromechanical devices that may utilize very detailed algorithms and detection methods.

Examples described herein provide a wiping assembly for a fluid ejection device. The wiping assembly may include a sled slidably movable relative to the fluid ejection device, a rotating shaft rotatably coupled to the sled, a length of wiping material spooled around the rotating shaft, and an indicator slidably coupled to the sled. The indicator changes position relative to the sled and abuts a homing surface based on an amount of the wiping material spooled around the rotating shaft.

The indicator may include at least one arm. The at least one arm is biased in a direction of a number of detents defined within the sled. The at least one arm, when engaged with the detents, restricts movement of the indicator in a direction opposite of a first direction at which a radii of the spooled wiping material decreases due to consumption of the wiping material.

The wiping assembly may further include a first biasing member to bias the indicator in the first direction. The wiping assembly may further include a second biasing member to bias the at least one arm in the direction of the detents.

The wiping assembly may also include a flag coupled to the indicator that protrudes outside a housing of the sled at a number of lengths based on the radii of the spooled wiping material. The flag abuts the homing surface when protruding from the housing. A sled position determination unit determines the position of the sled relative to the homing surface. The arms of the indicator, when engaged with the detents, restricts the sled from moving to an initial position of the sled. The initial position is a position of the sled initially sensed by the sled position determination unit when a maximum amount of the wiping material is spooled around the rotating shaft. The sled position determination unit transmits a number of notifications to a processor of a printing device in which the wiping assembly is embodied. The notifications indicate a level of use of the wiping material spooled around the rotating shaft.

Examples described herein also provide a mechanical indicator for indicating the usage level of a wiping material within a wiping assembly. The mechanical indicator includes a tension appendage to apply tension to the wiping material spooled around a rotating shaft of a wiping assembly. At least one arm is formed in the mechanical indicator. The at least one arm is biased in a direction of a number of detents defined within a sled to which the indicator is coupled. The mechanical indicator may also include a flange formed into the at least one arm. The flange engages with a number of detents.

When the at least one arm engages with the detents, the at least one arm restricts movement of the indicator in a direction opposite of a first direction. The first direction is a direction at which a radii of the spooled wiping material decreases due to consumption of the wiping material.

The tension appendage includes a wheel to apply tension to the wiping material and to allow the wiping material to spool out. The mechanical indicator further includes a biasing spring to bias the at east one arm in the direction of the detents to engage the flanges with the detents.

The mechanical indicator may further include a flag formed into the indicator. The flanges, when engaged with the detents, restrict the mechanical indicator from moving in a direction opposite to the first direction. The flag protrudes from a housing of the sled and abuts a homing surface based on an amount of the wiping material spooled around the rotating shaft. The flag restricts the sled from moving to an initial position.

Examples described herein also provide a method of detecting usage of a wiping material with a wiping assembly. The method may include, with a sled position determination unit, detecting an initial position of a sled of the wiping assembly. The method may further include, with a mechanical indicator, restricting the movement of the sled to the initial position. The restricting of the movement of the sled to the initial position indicates a level of usage of the wiping material.

The mechanical indicator, restricting the movement of the sled to the initial position includes engaging a number of flanges of a number of arms of the mechanical indicator with a number of detents defined within the sled. The engagement of the flanges causes a flag portion of the mechanical indicator to unretractably protrude from a housing of the sled and abut a homing surface. The protrusion of the flag portion defines the position of the sled relative to the homing surface. The method further includes, with the sled position determination unit, signaling a number of levels of wiping material usage to a processor of a printing device in which the wiping assembly is embodied.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1B:
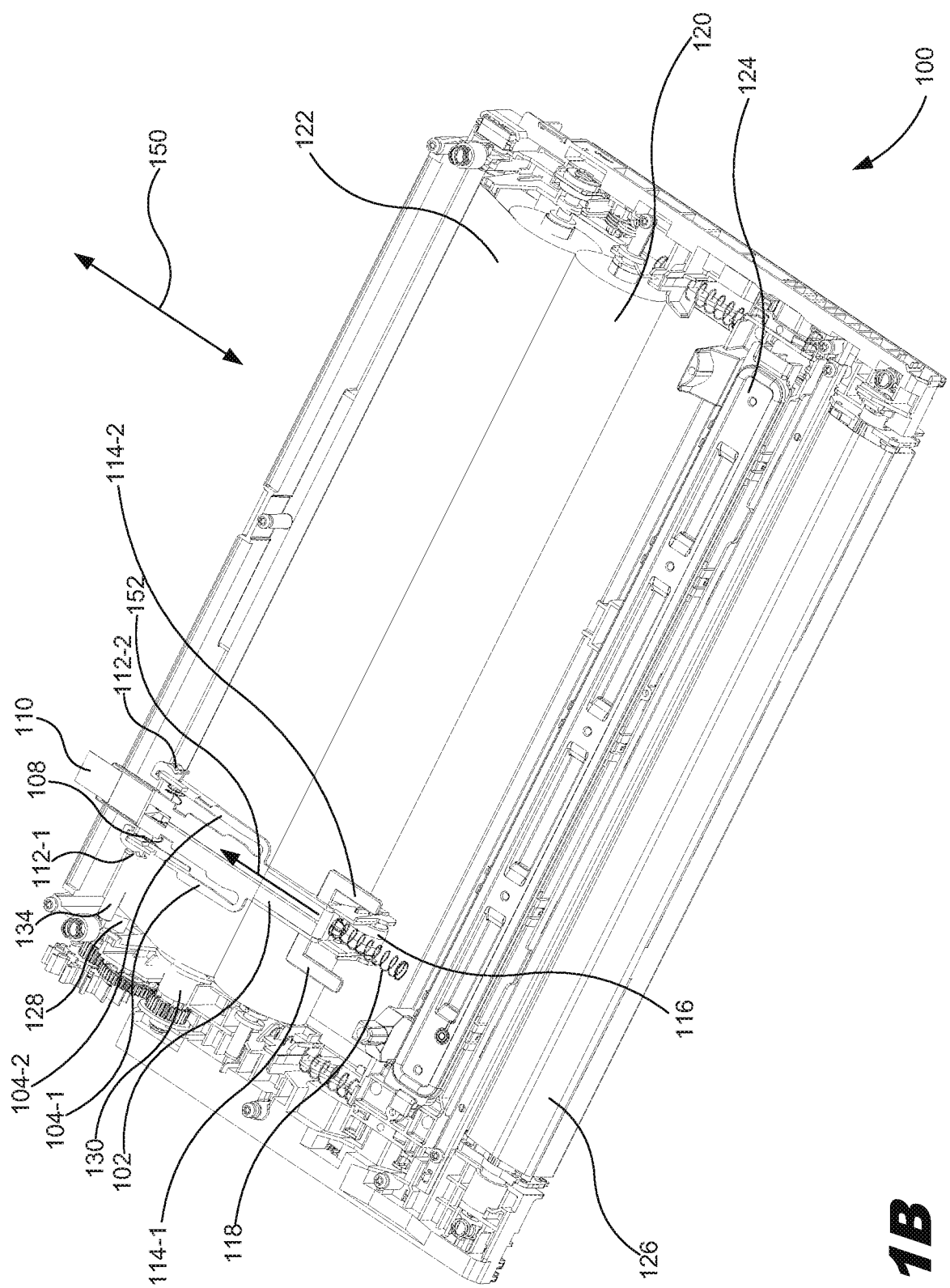
FIG. 1B is a back perspective view of the wiping assembly of FIG. 1A, according to one example of the principles described herein.
Figure 1C:
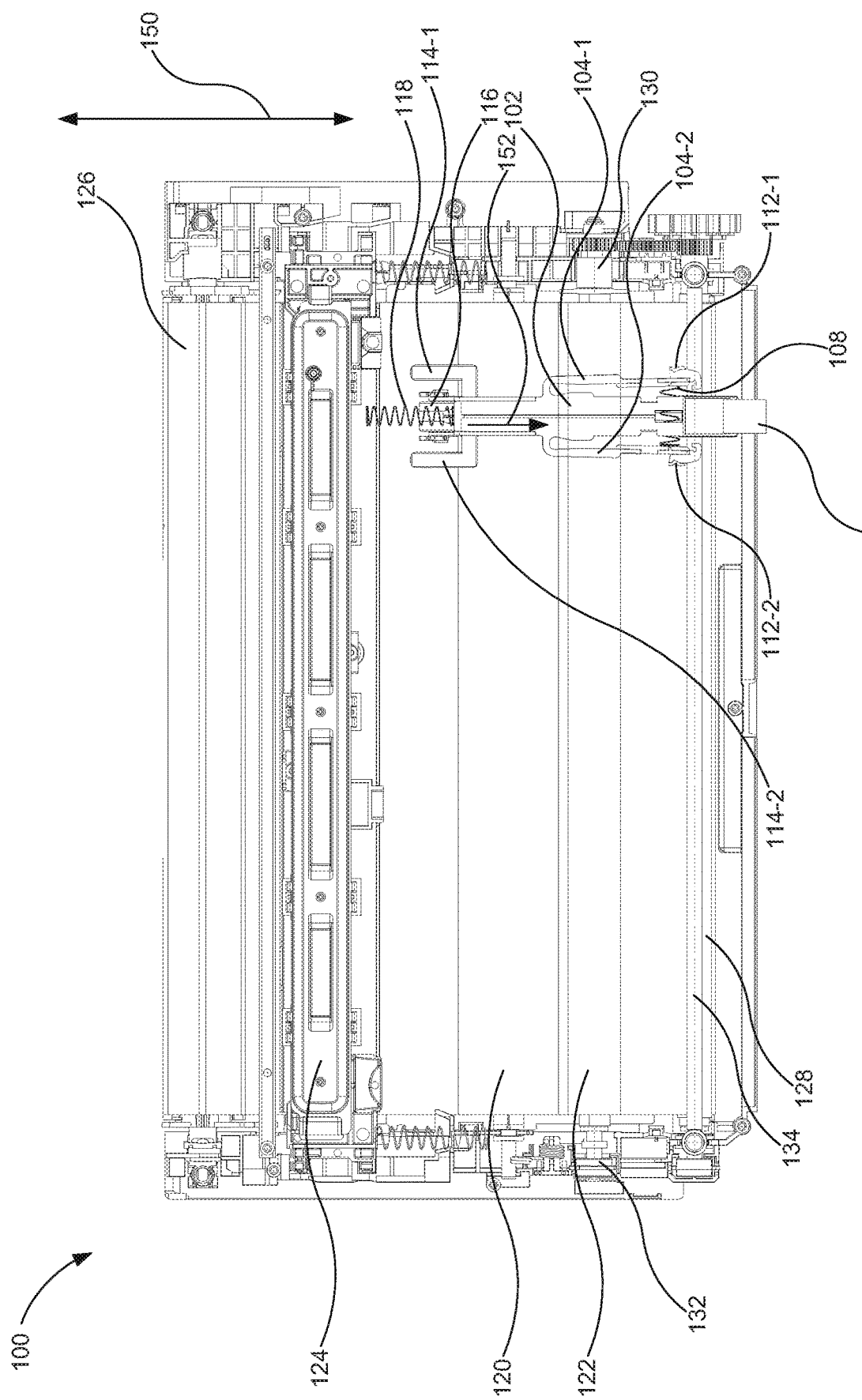
FIG. 1C is a top view of the wiping assembly of FIG. 1A, according to one example of the principles described herein.
Figure 1D:
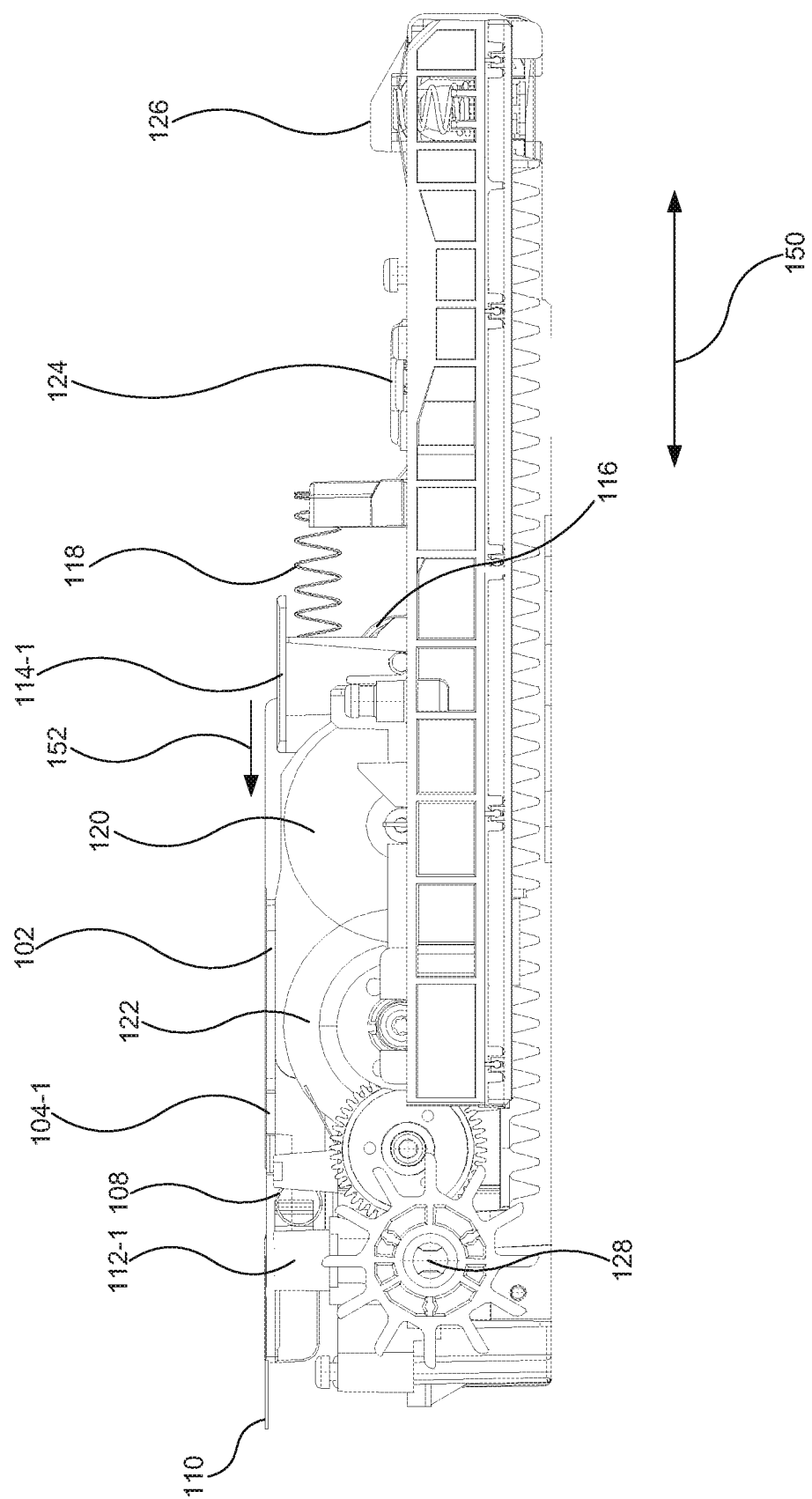
FIG. 1D is a side elevational view of the wiping assembly of FIG. 1A, according to one example of the principles described herein.

Turning now to the figures, FIG. 1A is a front perspective view of a wiping assembly (100) with a cover removed, according to one example of the principles described herein. FIGS. 1B through 1D will be described in connection with FIG. 1A. FIG. 1B is a back perspective view of the wiping assembly (100) of FIG. 1A, according to one example of the principles described herein. Further, FIG. 1C is a top view of the wiping assembly (100) of FIG. 1A, according to one example of the principles described herein. In addition, FIG. 1D is a side elevational view of the wiping assembly (100) of FIG. 1A, according to one example of the principles described herein. The wiping assembly (100) may be also referred to herein as a sled.

Arrow 150 is depicted in connection with the wiping assembly (100) of FIGS. 1A through 1D. Arrow 150 indicates a direction of travel of the wiping assembly (100) during operation of the wiping assembly (100). The wiping assembly (100) wipes a fluid ejection assembly (FIG. 4, 404) such as a printhead assembly of a fluid ejection device (FIG. 4, 400), such as an inkjet printer. In one example, the fluid ejection device (FIG. 4, 400) is a page-wide, inkjet printhead array.

Figure 4:
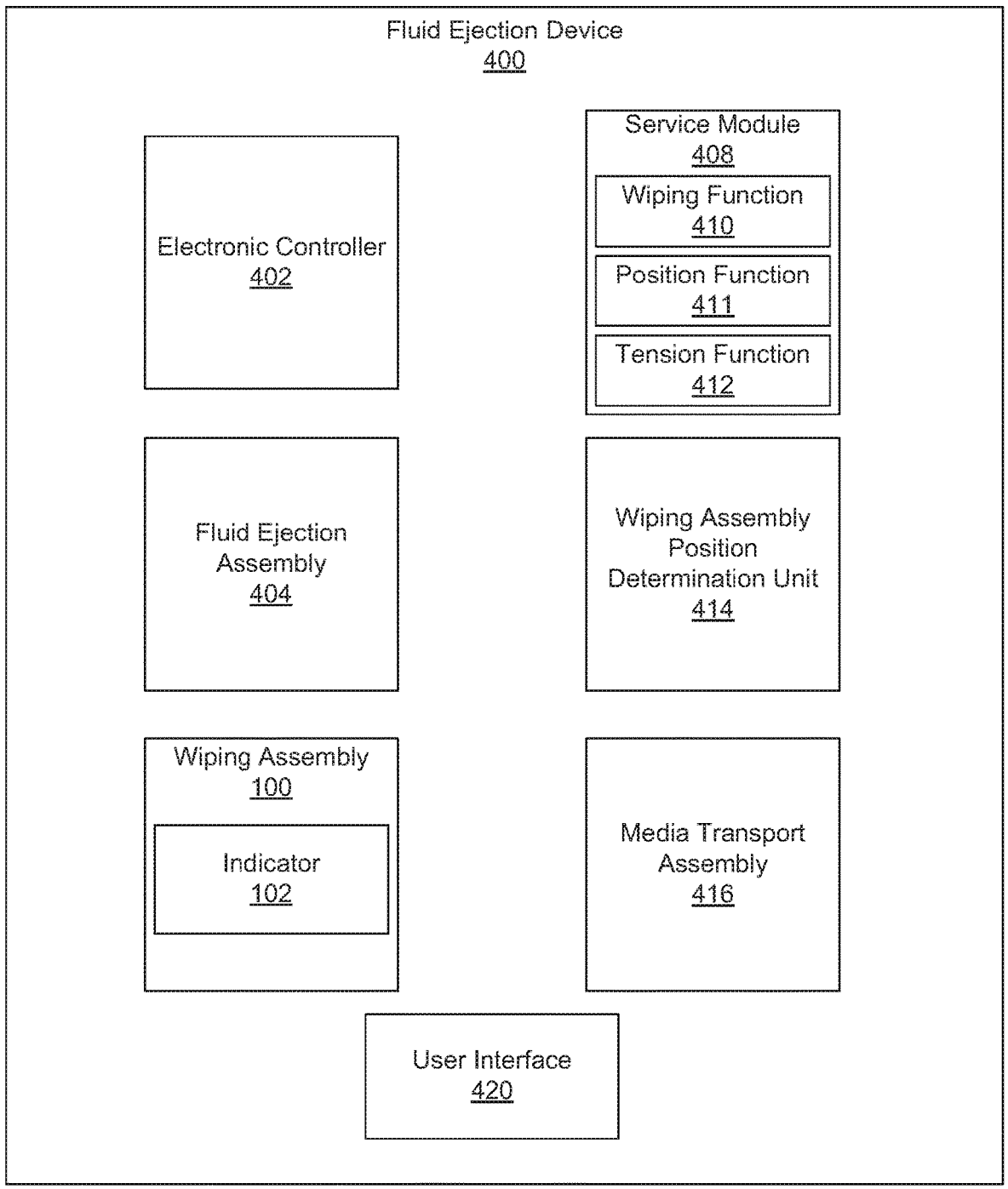
FIG. 4 is a block diagram of a fluid ejection device including the wiping assembly of FIGS. 1A through 1D and a web usage indicator of FIGS. 2A through 2D, according to one example of the principles described herein.

During, for example, a printing process, the fluid ejection assembly (FIG. 4, 404) may be wiped by the wiping assembly (100) to clean and protect the fluid ejection assembly (FIG. 4, 404). In one example, the wiping assembly (100) may be movably mounted to a chassis of the fluid ejection device (FIG. 4, 400) so the wiping assembly (100) may move under the fluid ejection assembly (FIG. 4, 404) as indicated by arrow 150 to perform the maintenance operations. In one example, the wiping assembly (100) may include a capping sub-system which caps the fluid ejection assembly (FIG. 4, 404). Thus, the capping sub-system of the wiping assembly (100) prevents pressure excursions to the fluid ejection assembly (FIG. 4, 404) while maintaining a humid environment, and to ensure that contaminants to not come into contact with the fluid ejection assembly (FIG. 4, 404) and to keep the fluid ejection assembly (FIG. 4, 404) from drying. Thus, the wiping assembly (100) wipes the fluid ejection assembly (FIG. 4, 404) to remove ink residue, as well as any paper dust or other debris that has collected on the fluid ejection assembly (FIG. 4, 404).

The wiping assembly (100) includes a supply roller (120) around which a supply of wiping material is spooled. The supply roller (120) may be a rotating shaft from which the wiping material is unspooled. The supply roller (120) supports a portion of the wiping material in a roll form. The wiping material may be provided in a flexible strip form and is routed and supported by guide rollers coupled to the wiping assembly (100) under a suitable amount of tension. The portion of the wiping material supported by the supply roller (120) not yet consumed in a cleaning operation may be referred to as unused or "fresh" in condition. The wiping material is defined by a width that is equal to, or greater than, a lengthwise (i.e., printable width) aspect of a fluid ejection assembly (FIG. 4, 404) to be cleaned.

The wiping material may be any material capable of wiping ink and contaminants from the fluid ejection assembly (FIG. 4, 404). In one example, the wiping material may be any suitable, absorbent material such as non-woven microfibers, nylon, polyester, cotton fabric, latex, woolen or synthetic felt, any other suitable, generally soft material selected so as to make non-damaging wiping contact with the fluid ejection assembly (FIG. 4, 404), or combinations thereof.

The wiping material may have a grammage (i.e., paper density) of 30, 60, 80, or 100 grams per square meter (g/m2) and may have an initial length before consumption of approximately 10 to 14 feet long. In one example, the wiping material spooled on the supply roller (120) is used once as it is consumed by the fluid ejection device (FIG. 4, 400) during maintenance processes. In this example, the wiping assembly (100) further includes a take up reel (122) to collect and spool used wiping material. In another example, a continuous band of wiping material may be used within the wiping assembly (100).

In one examples, at least some features of the wiping assembly (100) minimize lateral shifting that may be referred to as "walking of the wiping material relative to the rollers used throughout the wiping assembly (100) on which the wiping material is mounted. In some examples, this lateral shifting of the wiping material is minimized via a particular arrangement of the rollers and a particular location at which tension is applied to the wiping material such as about the supply roller (120) through use of the indicator (102) described herein. The use of these elements within the wiping assembly (100) reduces the overall tension applied on the wiping material about the rollers.

The wiping assembly (100) further includes an applicator assembly (126) that provides an area on which the wiping material may be brought into contact with the fluid ejection assembly (FIG. 4, 404) for cleaning and maintenance. A cap assembly (124) may also be included within the wiping assembly (100). The cap assembly (124) is used to cap nozzles of the fluid ejection assembly (FIG. 4, 404) between printing operations or during other times when the fluid ejection assembly (FIG. 4, 404) is not operating.

The wiping assembly (100) further includes a torque limiter (130) and an anti-backdrive assembly (132) associated with the take up reel (122). The torque limiter (130) ensures that the take up reel (122) does not tear the wiping material through over torque as it spools the consumed wiping material.

In one example, the torque limiter (130) may be packaged as a shaft coupling or as a hub for a sprocket or a sheave. In another example, the torque limiter (130) may be an overload clutch or slip clutch. In one example, the torque limiter (130) may provide a torque limit of approximately 70 ounce-force-inches (oz·in) of torque.

The anti-backdrive assembly (132) is used to ensure that the take up reel (122) does not rotate in a direction other than that direction used to spool the consumed wiping material. In one example, the anti-backdrive assembly (132) may be a pawl that engages with a gear or other element or surface attached to the take up reel (122).

Further, the wiping assembly (100) includes a pinch drive shaft (128) and an associated pinch idler shaft (134). In one example, both the pinch drive shaft (136) and an associated pinch idler shaft (134) include an ethylene propylene diene monomer (EPDM) (M-class) rubber molding covering at least a portion of the shafts (128, 134). The EPDM rubber molding reduces or eliminates the chances of the wiping material slipping as it moves between the pinch drive shaft (128) and the pinch idler shaft (134) to the take up reel (122) due to the approximately 70 ounce-force-inches (oz·in) of torque exerted by the take up reel (122).

A first biasing member (118) is interposed between a stationary portion of the wiping assembly (100) and the indicator (102). In one example, the first biasing member (118) is a spring. The first biasing member (118) causes the indicator (102) to move in the direction of arrow 152. In this manner, the first biasing member (118) forces the indicator (102) in the direction of arrow 152 and creates tension between the indicator (102) and the supply roller (120) as will be described in more detail below.

Figure 2A:
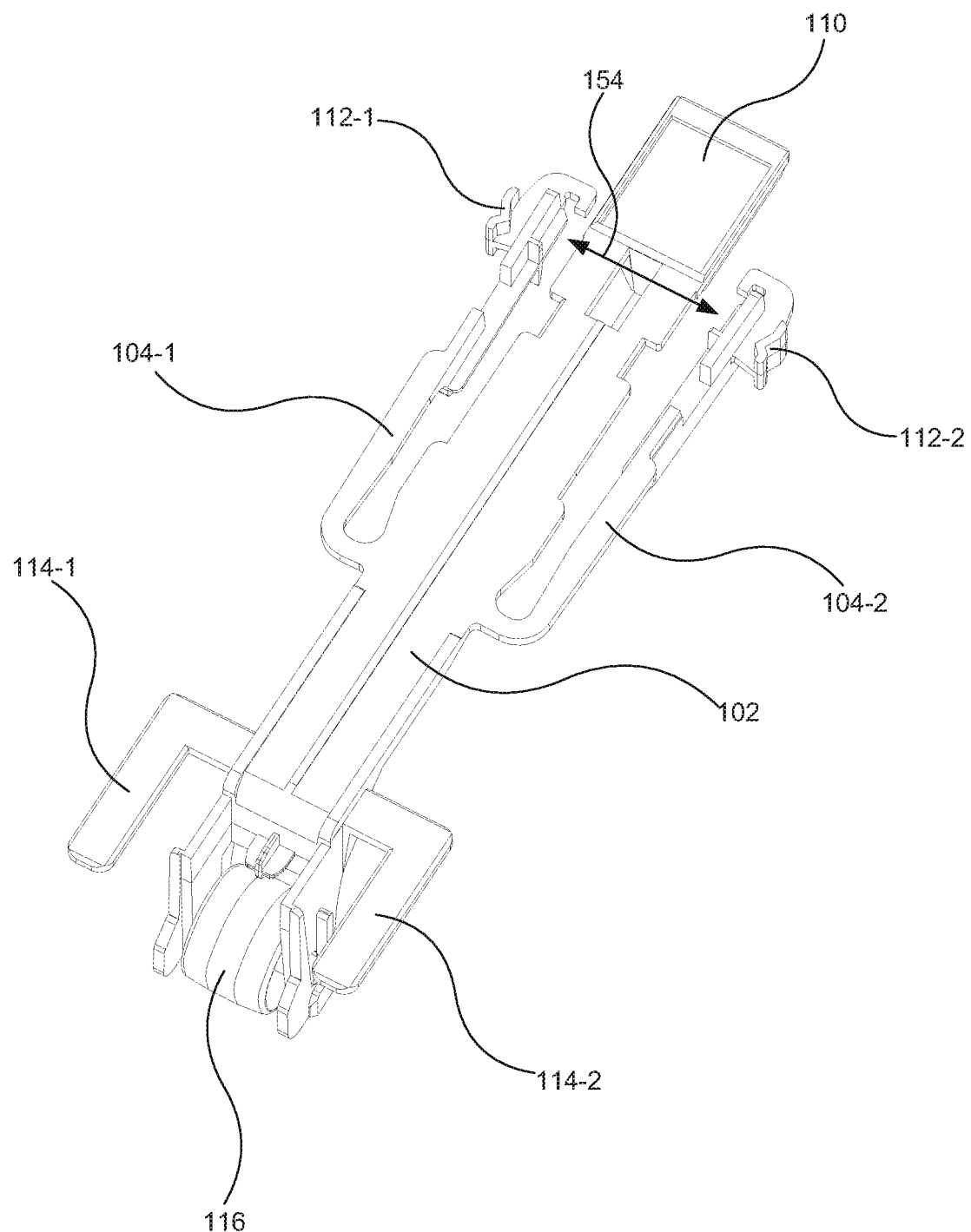
FIG. 2A is a top perspective view of a web usage indicator, according to one example of the principles described herein.
Figure 2B:
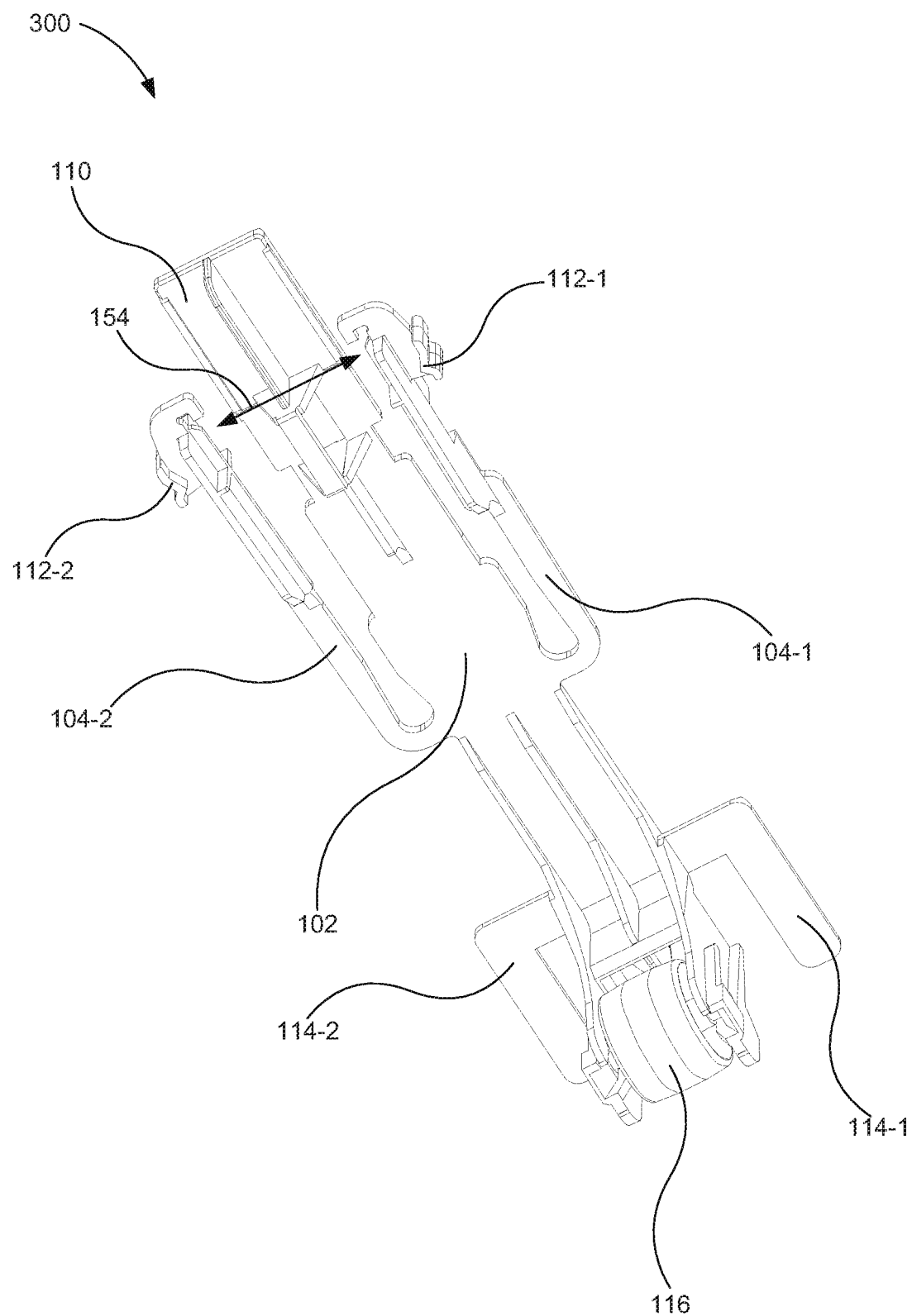
FIG. 2B is a bottom perspective view of the web usage indicator of FIG. 2A, according to one example of the principles described herein.
Figure 2C:
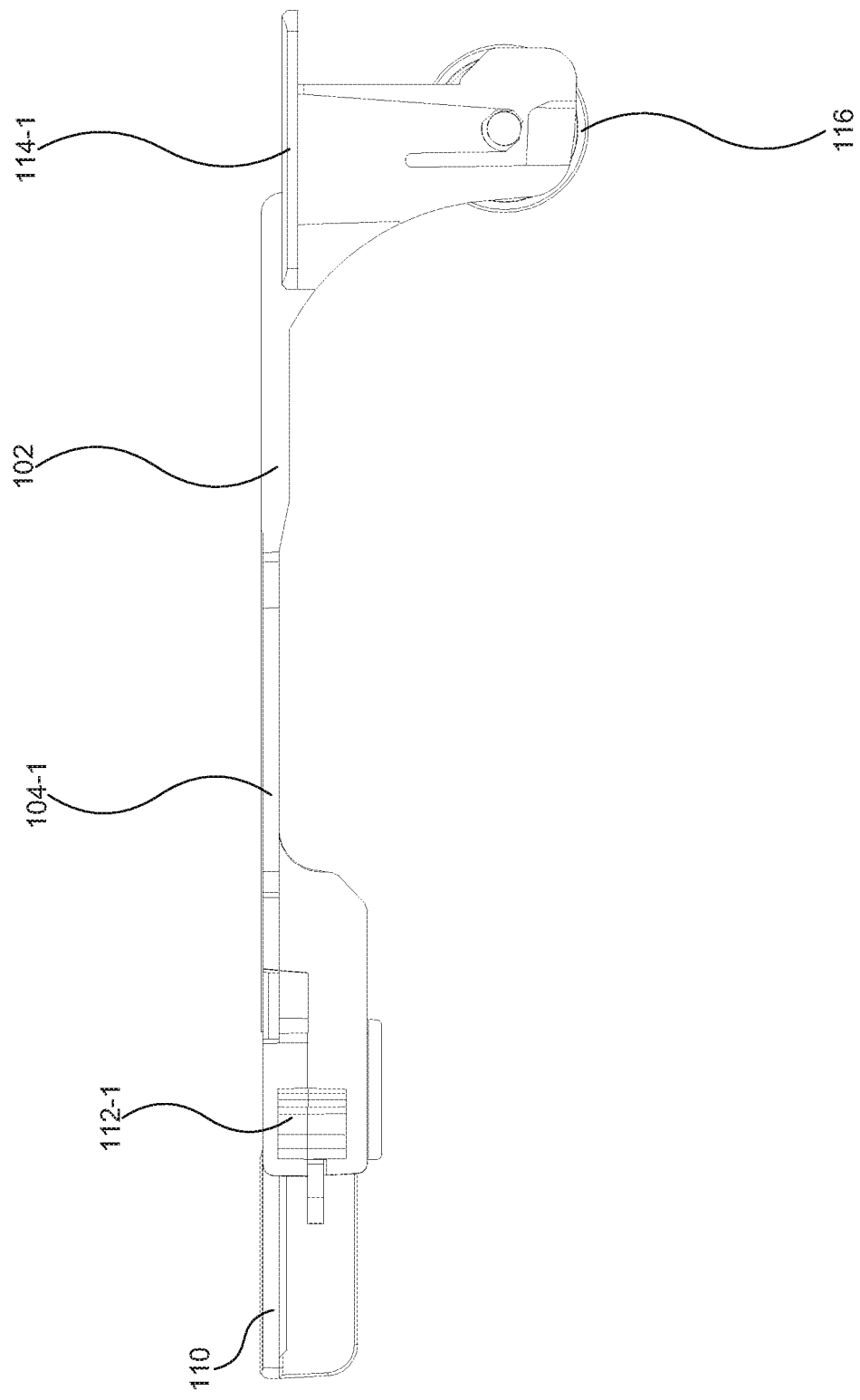
FIG. 2C is a side elevational view of the web usage indicator of FIG. 2A, according to one example of the principles described herein.
Figure 2D:
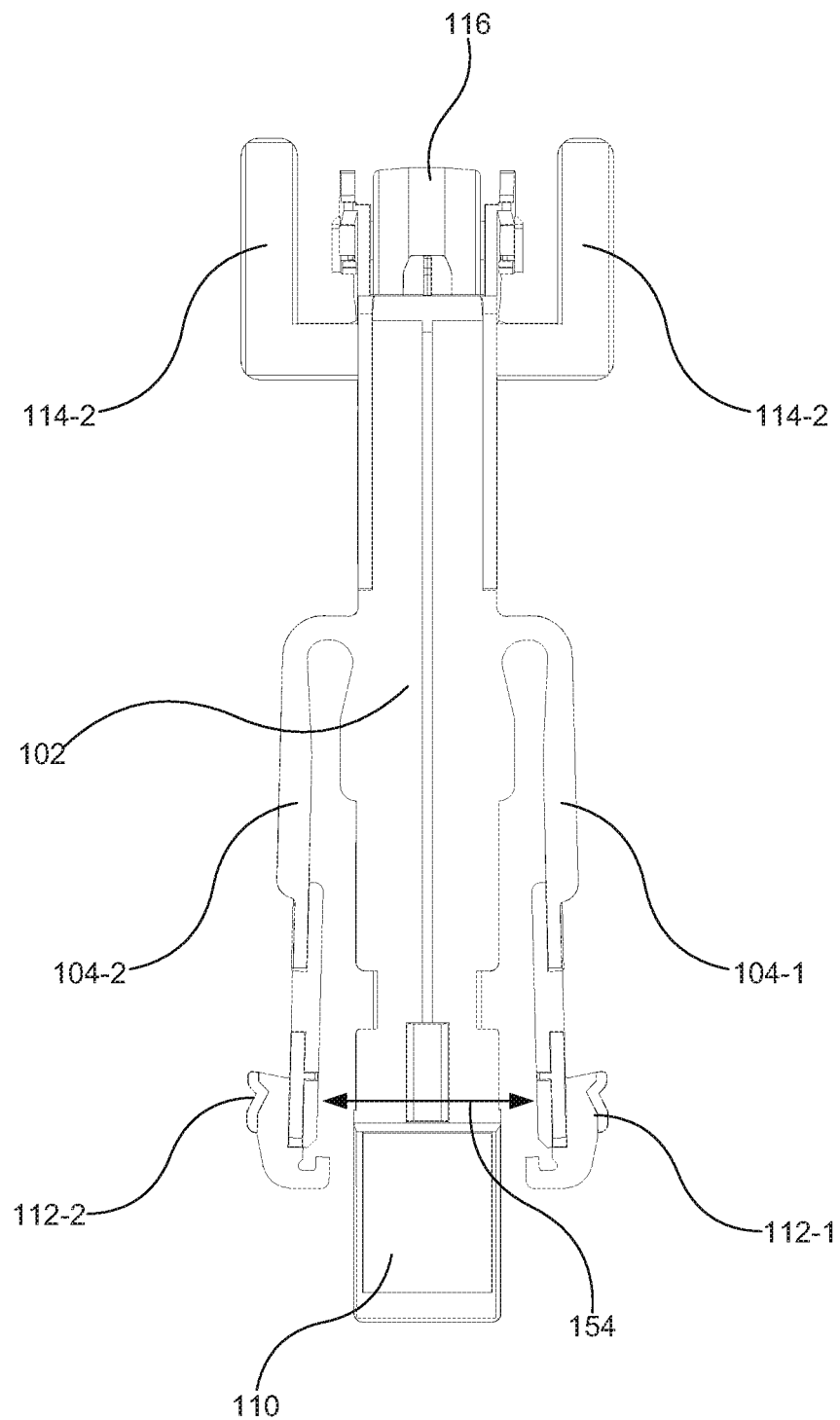
FIG. 2D is a top view of the web usage indicator of FIG. 2A, according to one example of the principles described herein.

Elements of the indicator (102) included and identified in FIGS. 1A through 1D, will now be described in connection with FIGS. 2A through 2D. FIG. 2A is a top perspective view of a web usage indicator (102), according to one example of the principles described herein. FIG. 2B is a bottom perspective view of the web usage indicator (102) of FIG. 2A, according to one example of the principles described herein. FIG. 2O is a side elevational view of the web usage indicator (102) of FIG. 2A, according to one example of the principles described herein. FIG. 2D is a top view of the web usage indicator (102) of FIG. 2A, according to one example of the principles described herein.

The indicator (102) includes at least one arm (104-1, 104-2). In the examples described herein, the indicator (102) includes a first arm (104-1) and a second arm (104-2). The first arm (104-1) and second arm (104-2) are biased in a direction of a number of detents (FIGS. 3A through 3C, 302-1, 302-2, 304-1, 304-2) defined within the wiping assembly (100) to which the indicator (102) is coupled as indicated by double arrow 154. In on example, the first arm (104-1) and second arm (104-2) are biased using the spring force of the first arm (104-1) and second arm (104-2). In this example, the first arm (104-1) and second arm (104-2) are elastically deformed in a first position as depicted in, for example, FIG. 3A, and are able to move away from the center of the indicator (102) when the force keeping the arms (104-1, 104-2) relatively closer to the center of the indicator (102). When this force is no longer applied, the arms (104-1, 104-2) return to their original expanded positions. In this example, elastomers, shape memory metals, rubbers, and other materials that are governed by Hooke's law may be used.

In another example as depicted throughout the figures, a second biasing member (108) may be used to force the first arm (104-1) and second arm (104-2) apart from each other and the center of the indicator (102). In this example, the biasing member may be a spring that forces the first arm (104-1) and second arm (104-2) apart as indicated by double arrow 154.

The arms (104-1, 104-2) each include flanges (112-1, 112-2). The flanges (112-1, 112-2) are used to engage with the detents (FIGS. 3A through 3C, 302-1, 302-2, 304-1, 304-2) defined within the wiping assembly (100) in order to restrict movement of the indicator (102) in a direction opposite arrow 152. As will be described in more detail below, restricting the movement of the indicator (102) in a direction opposite arrow 152 causes a flag portion (110) of the indicator (102) to protrude from a housing of the wiping assembly (100) and abut a homing surface. Unretractable protrusion of the flag (110) of the indicator (102) causes the wiping assembly (100) to not be able to return to an initial position it was in before the flanges (112-1, 112-2) engaged with the detests (FIGS. 3A through 30, 302-1, 302-2, 304-1, 304-2). A position determination unit (FIG. 4, 414) is used to detect a difference between a current position of the wiping assembly (100) and its initial position. This difference translates into an amount of remaining wiping material present on the supply roller (120), or, in other words, the amount of wiping material consumed. The position determination unit (FIG. 4, 414) may be any electronic device, mechanical device, or combination of electronic and mechanical devices that can identify the general position of the wiping assembly (100) within the fluid ejection device (FIG. 4, 400) and the position of the wiping assembly (100) relative to a horning surface (FIGS. 3A through 3C, 360).

Turning again to FIGS. 2A through 2D, the indicator (102) also includes a tension wheel (116). The tension wheel (116) exerts tension on the wiping material as the wiping material is spooled off from the supply roller (120) during operation of the wiping assembly (100). In this manner, the indicator (102) functions as both an indicator of remaining wiping material on the supply roller (120) and a tensioner for ensuring a degree of tension is applied to the wiping material during unspooling. The tension wheel (116) is rotatable about an axis parallel to the direction of unspooling of the wiping material in order to allow the wiping material to smoothly unspool while still being able to apply a sufficient amount of tension on the wiping material.

A pair of guide arms (114-1, 114-2) is also formed on the indicator (102). The guide arms (114-1, 114-2) are used to couple the indicator (102) to the wiping assembly (100), and to guide the indicator (102) as it moves relative to the wiping assembly (100). In one example, the guide arms (114-1, 114-2) couple to a pair of guide channels (FIGS. 3A through 3C, 314-1, 314-2) defined within a portion of the wiping assembly (100) such as a cover (350) or other portion of the housing.

Figure 3A:
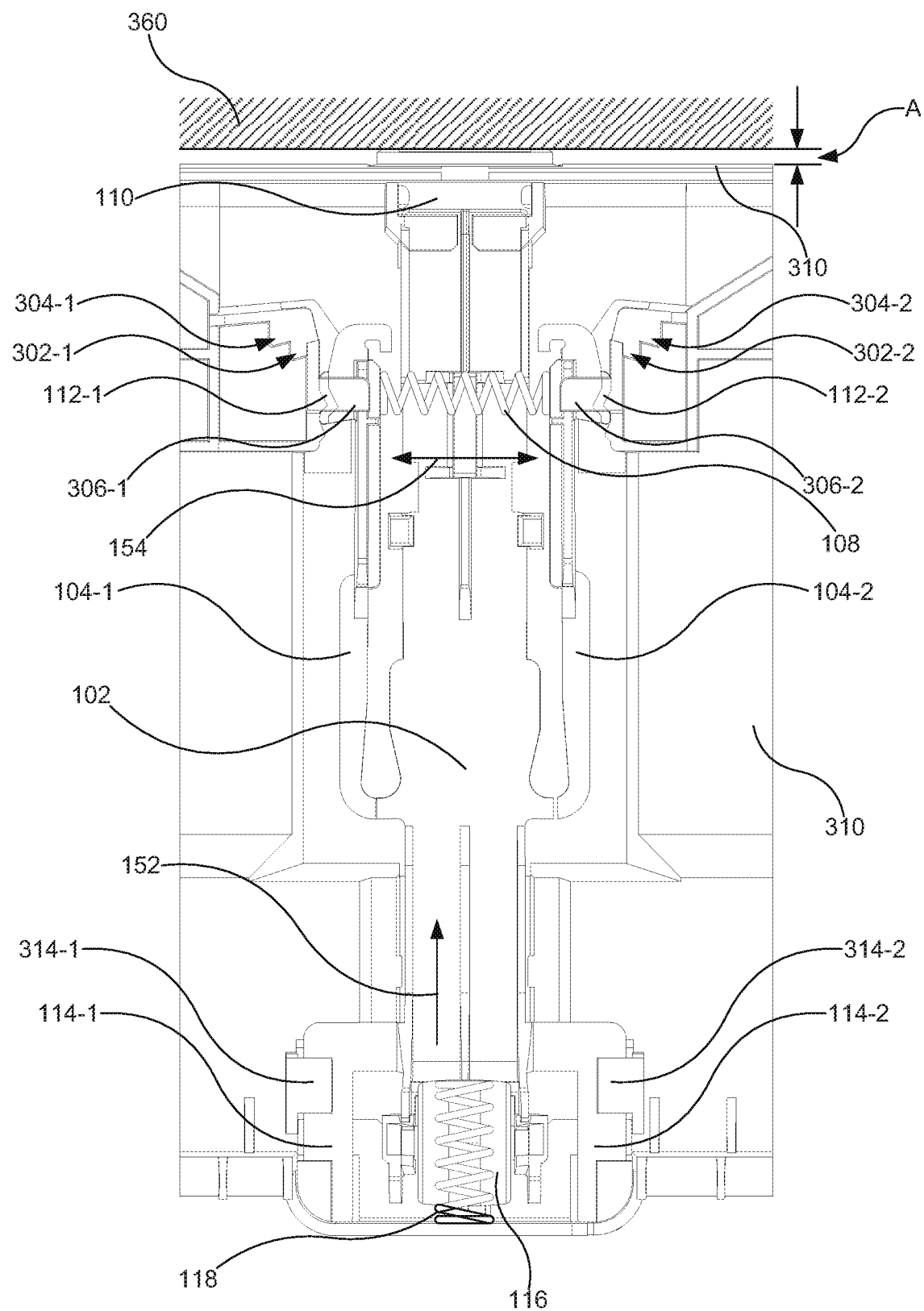
FIG. 3A is a bottom perspective view of the web usage indicator of FIG. 2A included within a portion of the wiping assembly of FIGS. 1A through 1D in a non-engaged position, according to one example of the principles described herein.
Figure 3B:
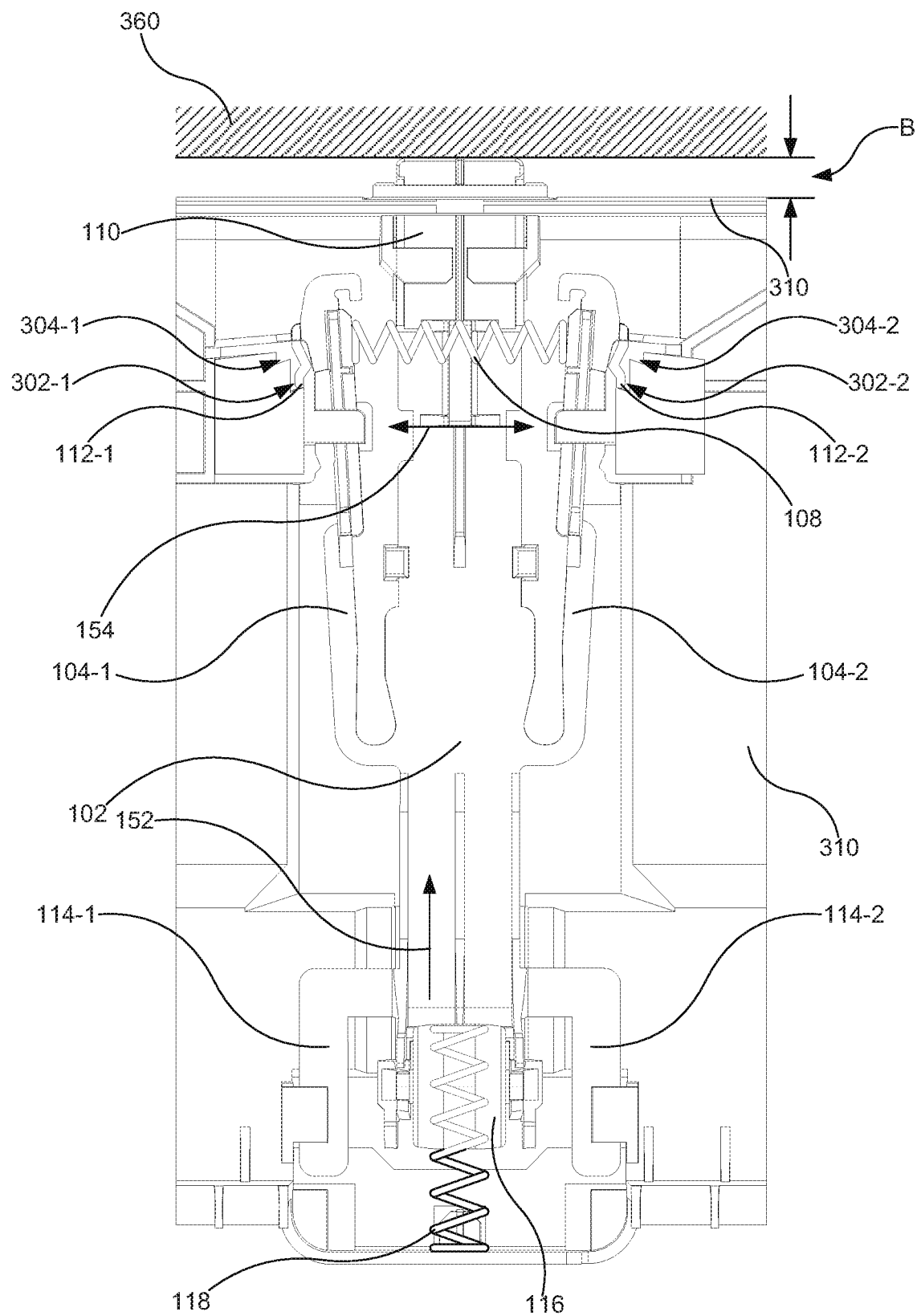
FIG. 3B is a bottom perspective view of the web usage indicator of FIG. 3A in a first engaged position, according to one example of the principles described herein.
Figure 3C:
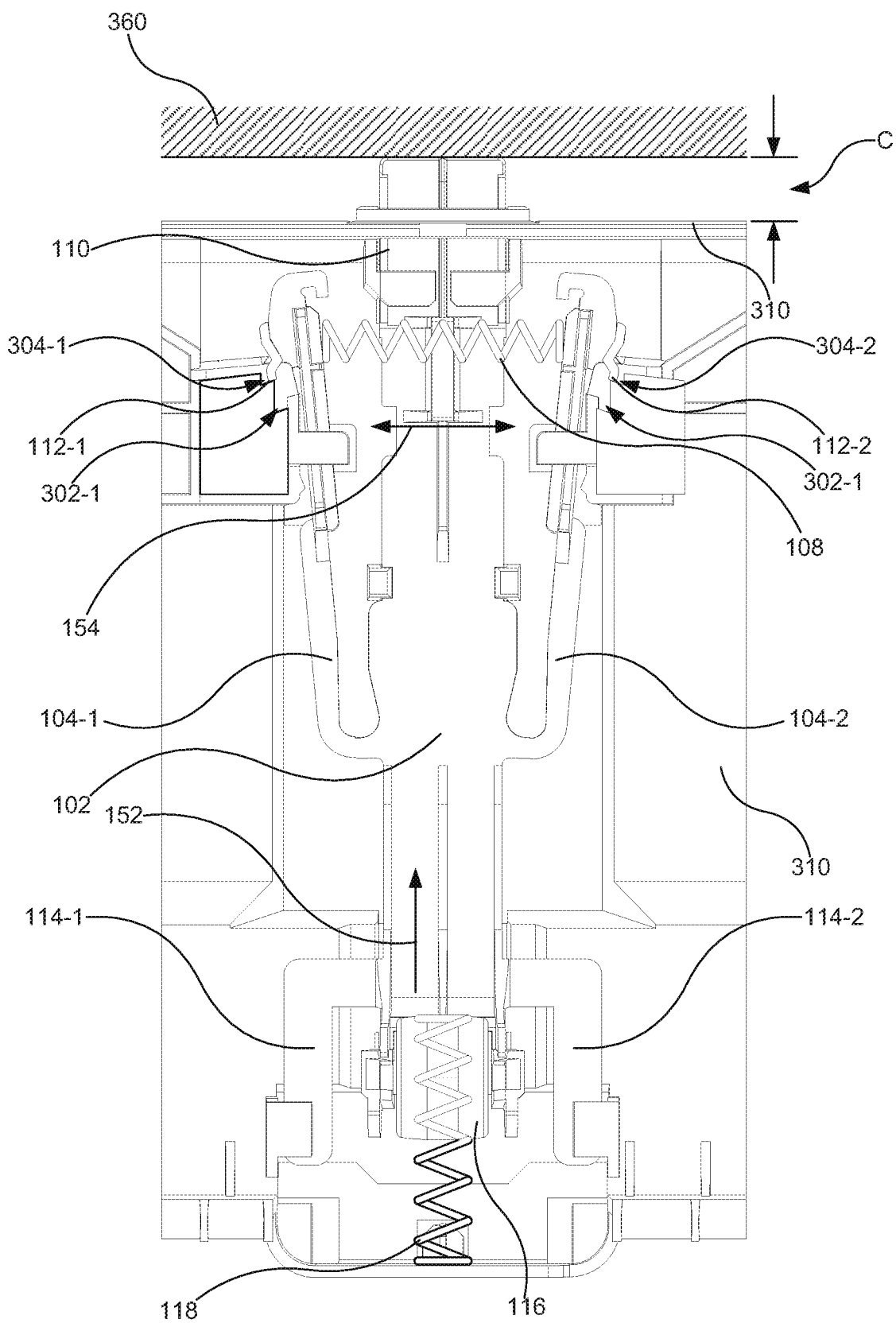
FIG. 3C is a bottom perspective view of the web usage indicator of FIG. 3A in a second engaged position, according to one example of the principles described herein.

FIG. 3A is a bottom perspective view of the web usage indicator (102) of FIG. 2A included within a portion of the wiping assembly (100) of FIGS. 1A through 1D in a non-engaged position, according to one example of the principles described herein. FIG. 3B is a bottom perspective view of the web usage indicator (102) of FIG. 3A in a first engaged position, according to one example of the principles described herein. FIG. 3C is a bottom perspective view of the web usage indicator (102) of FIG. 3A in a second engaged position, according to one example of the principles described herein. FIGS. 3A through 3C depict the indicator (102) in a number of different positions within the wiping assembly (100) with respect to a cover (310) or housing of the wiping assembly (100).

The cover (310) is indicated twice in each of FIGS. 3A through 3C in order to indicate that the surfaces behind the indicator (102) form the cover. Thus, in reference to FIGS. 1A through 1D, the cover (310) is not shown, but is a portion or a housing that covers the internal elements or the wiping assembly (100). The indicator (102) is coupled to the cover (310) via the pair of guide channels (314-1, 314-2) and a pair of arm channels (306-1, 306-2) defined within the cover. Thus, the guide channels (314-1, 314-2) retain the guide arms (114-1, 114-2) on a first end of the indicator (102) and the arm channels (306-1, 306-2) retain the arms (104-1, 104-2) on a second end of the indicator (102). As seen throughout FIGS. 3A through 3O, the indicator (102) is retained within the cover (310) at all positions of the indicator (102) as the indicator (102) moves with respect to the cover (310).

The movement of the indicator (102) with respect to the cover (310) will now be described. As mentioned above, the first biasing member (118) biases the indicator in the direction of arrow 152. In doing so, the first biasing member (118) creates tension between the tension wheel (116) and the wiping material spooled off from the supply roller (120). The first biasing member (118) also causes the indicator (102) to move in the direction of arrow 152 as the radii of the wiping material spooled around the supply roller (120) decreases due to consumption of the wiping material during cleaning and maintenance processes.

As the indicator (102) moves in the direction of arrow 152, the arms (104-1, 104-2) move within the arm channels (306-1, 306-2), and begin to extend and separate as indicated by arrow 154. During the phase of wiping material usage depicted in FIG. 3A, the arms (104-1, 104-2) freely move within the arm channels (306-1, 306-2) without engagement with a number of detents (302-1, 302-2, 304-1, 304-2) defined within the cover (310). At the same time, the flag portion (110) of the indicator (102) freely extends from and retracts into the cover (310). At this stage of deployment of the indicator (102), the flag portion (110) abuts a homing surface (360), but does not keep the wiping assembly (100) from moving or returning to an initial position it was in when the wiping assembly (100) was new, and the supply roller (120) was completely full of wiping material. During operation, the wiping assembly (100) moves in the direction of arrow 150 as indicated in FIGS. 1A through 1D in order to clean and maintain a fluid ejection assembly (FIG. 4, 404). The wiping assembly (100) uses the homing surface (360) as a surface from which it can locate itself within the fluid ejection device (FIG. 4, 400). In one example, the fluid ejection device (FIG. 4, 400) uses a wiping assembly position determination unit (FIG. 4, 414) to determine its position throughout and between operations. One such position is the initial position with respect to the homing surface (360). Thus, in FIG. 3A, the protrusion of the flag portion (110) of the wiping assembly (100) does not keep the wiping assembly (100) from moving or returning to the initial position. Instead, the abutment of the flag portion (110) with the homing surface overcomes the biasing action of the first biasing member (118) and causes the flag portion (110) and the remainder of the indicator (102) to retract into the cover (310). In this state, the distance between the wiping assembly (100) and the homing surface (360) is indicated by distance A. Distance A is equivalent to the initial position of the wiping assembly (100) with respect to the homing surface (360).

With reference to FIGS. 3B and 3C, the wiping material may have been consumed to a level that the arms (104-1, 104-2) have engaged with the detents (302-1, 302-2, 304-1, 304-2) defined within the cover (310) of the wiping assembly (100). In the case of FIG. 3B, the arms are engaged with a first set of detents (302-1, 302-2). The second biasing member (108) forces the arms 104-1, 104-2 outward as depicted by arrow 154 and causes the flanges (112-1, 112-2) to engage with the first set of detents (302-1, 302-2). In the state depicted in FIG. 3B, the distance between the wiping assembly (100) and the homing surface (360) is indicated by distance B. Distance B defines an amount of wiping material usage that is considered low or otherwise intermediary to a state where the wiping material is completely consumed. Thus, when the flanges (112-1, 112-2) of the arms (104-1, 104-2) engage with the first set of detents (302-1, 302-2), the wiping assembly (100) is unable to return to the initial position. The position determination unit (414) determines that the position of the wiping assembly (100) between maintenance processes has changed and that the wiping assembly is unable to return to the initial position. This change in distance may be determined by the position determination unit (414) executing a check rear position function. The check rear position function produces a rear position value. A number of notifications may be sent by the position determination unit (FIG. 4, 414) to an electronic controller (FIG. 4, 402) of the fluid ejection device (FIG. 4, 400) that identify corresponding level of wiping material consumption as indicated by the rear position value. This notification may be presented to a user of the fluid ejection device (FIG. 4, 400) to notify the user of the low or intermediary level of wiping material consumption within the wiping assembly (100).

With respect to FIG. 3C, the arms are engaged with a second set of detents (304-1, 304-2). The second biasing member (108) continues to force the arms (104-1, 104-2) outward as depicted by arrow 154 and causes the flanges (112-1, 112-2) to engage with the second set of detents (304-1, 304-2). In the state depicted in FIG. 3C, the distance between the wiping assembly (100) and the homing surface (360) is indicated by distance C. Distance C defines an amount of wiping material usage that is considered completely consumed. Thus, when the flanges (112-1, 112-2) of the arms (104-1, 104-2) engage with the second set of detents (304-1, 304-2), the wiping assembly (100) is unable to return to the position it was in during the state of FIG. 3B. The position determination unit (414) determines that the position of the wiping assembly (100) between maintenance processes has again changed and that the wiping assembly is unable to return to the position it was in as described above in connection with FIG. 3B. Again, this determination may be processed by executing the check rear position function to obtain a rear position value. A number of notifications may be sent by the position determination unit (FIG. 4, 414) to an electronic controller (FIG. 4, 402) of the fluid ejection device (FIG. 4, 400) that identify a complete consumption of the wiping material. This notification may be presented to a user of the fluid ejection device (FIG. 4, 400) to notify the user of the complete consumption of the wiping material within the wiping assembly (100).

In one example, the distance of travel of the indicator (102) within the cover (310) in order to reach the first set of detents (302-1, 302-2) is based on a number of parameters including the length of the indicator (102), the length of the arms (104-1, 104-2), the size of and distance between the detents (302-1, 302-2, 304-1, 304-2), the initial radius of the wiping material spooled around the supply roller (120), and the space within the cover (310) between the end of the flag portion (110) and the homing surface (360), among other parameters. In one example, the distance of travel of the indicator (102) within the cover (310) in order to reach the first set of detents (302-1, 302-2) is approximately between 2 mm and 6 mm. In another example, the distance of travel of the indicator (102) within the cover (310) in order to reach the first set of detents (302-1, 302-2) is approximately 4 mm.

Similarly, in one example, the distance of travel of the indicator (102) within the cover (310) in order to reach the second set of detents (304-1, 304-2) is based on a number of parameters including the length of the indicator (102), the length of the arms (104-1, 104-2), the size of and distance between the detents (302-1, 302-2, 304-1, 304-2), the initial radius of the wiping material spooled around the supply roller (120), and the space within the cover (310) between the end of the flag portion (110) and the homing surface (360), among other parameters. In one example, the distance of travel of the indicator (102) within the cover (310) in order to reach the second set of detents (304-1, 304-2) is greater than 4 mm. In another example, the distance of travel of the indicator (102) within the cover (310) in order to reach the first set of detents (302-1, 302-2) is approximately 4 mm.

In another example, the distance of travel of the indicator (102) within the cover (310) in order to reach the first and second set of detents (302-1, 302-2, 304-1, 304-2) is based on a desired percentage of wiping material usage before engagement of the flanges (112-1, 112-2) of the arms (104-1, 104-2) engage with the detents (302-1, 302-2, 304-1, 304-2). In one example, a threshold of approximately between 100% and 0% of wiping material usage may be accomplished before the flanges (112-1, 112-2) of the arms (104-1, 104-2) engage with the detents (302-1, 302-2, 304-1, 304-2). In another example, approximately between 50% and 0% of wiping material usage may be accomplished before the flanges (112-1, 112-2) of the arms (104-1, 104-2) engage with the detents (302-1, 302-2, 304-1, 304-2). In still another example, between 20% and 0% of wiping material usage may be accomplished before the flanges (112-1, 112-2) of the arms (104-1, 104-2) engage with the detents (302-1, 302-2, 304-1, 304-2). In one example, between 20% and 5% of wiping material usage may be accomplished before the flanges (112-1, 112-2) of the arms (104-1, 104-2) engage with the first detents (302-1, 302-2). In another example, between 10% and 5% of wiping material usage may be accomplished before the flanges (112-1, 112-2) of the arms (104-1, 104-2) engage with the first detents (302-1, 302-2). Further, in one example, between 10% and 0% of wiping material usage may be accomplished before the flanges (112-1, 112-2) of the arms (104-1, 104-2) engage with the second detents (304-1, 304-2). In another example, between 5% and 0% of wiping material usage may be accomplished before the flanges (112-1, 112-2) of the arms (104-1, 104-2) engage with the second detents (304-1, 304-2). In still another example, approximately 0% of wiping material usage may be accomplished before the flanges (112-1, 112-2) of the arms (104-1, 104-2) engage with the second detents (304-1, 304-2).

Although two sets of detents (302-1, 302-2, 304-1, 304-2) are used in the examples described herein, any number of detents (302-1, 302-2, 304-1, 304-2) may be used to define different and varied levels of wiping material consumption, For example, a number of additional detents (302-1, 302-2, 304-1, 304-2) may be defined within the cover (310) that indicate between 0% and 100% consumption of the wiping material. In one example, additional detents (302-1, 302-2, 304-1, 304-2) may be defined in the cover (310) that indicate 50%, 75%, 90% and 100% wiping material consumption. In these examples, notifications may be sent by the position determination unit (FIG. 4, 414) to an electronic controller (FIG. 4, 402) of the fluid ejection device (FIG. 4, 400) that identify corresponding levels of wiping material consumption. These notifications may be presented to a user of the fluid ejection device (FIG. 4, 400) to notify the user of the level of wiping material consumption within the wiping assembly (100).

Turning now to FIG. 4, FIG. 4 is a block diagram of a fluid ejection device (400) including the wiping assembly (100) of FIGS. 1A through 1D and a web usage indicator (102) of FIGS. 2A through 2D, according to one example of the principles described herein. The fluid ejection device (400) includes an electronic controller (402), a fluid ejection assembly (404), and a media transport assembly (416). In one example, the fluid ejection assembly (404) includes at least one fluid ejection array that ejects drops of ink through orifices or nozzles and toward a print media to print onto the print media. In one example, the fluid ejection array includes an inkjet printhead. In another example, the fluid ejection array may include other types of printheads. Print media is any type of suitable sheet material, such as paper, card stock, envelopes, labels, and transparencies, among other print media. The nozzles of the fluid ejection array are arranged in at least one column or at least one array such that properly sequenced ejection of ink from nozzles causes characters, symbols, and/or other graphics or images to be printed upon print media as relative movement occurs between fluid ejection assembly and print media.

The media transport assembly (416) positions print media relative to the fluid ejection assembly (404). Thus, a print zone may be defined adjacent to the nozzles of the fluid ejection array in an area between fluid ejection assembly (404) and the print media. In one example, the fluid ejection assembly (404) is a non-scanning-type fluid ejection assembly, such as a page wide array of fluid ejection devices. In the example, the non-scanning-type fluid ejection assembly does not move laterally across a page during printing. Rather, the media transport assembly (416) advances or positions print media relative to the stationary fluid ejection assembly (416).

In one example, the electronic controller (402) communicates with at least the fluid ejection assembly (404) and the media transport assembly (416). In some examples, the electronic controller (402) receives data from a host system, such as a computer, and includes memory for temporarily storing the data. The data may be sent to the fluid ejection device (400) along an electronic, infrared, optical or other information transfer path. The data represents, for example, an image, a document, and/or file to be printed. As such, the data forms a print job for the fluid ejection device (400) and includes print job commands and/or command parameters.

In one example, the electronic controller (402) provides control of the fluid ejection assembly (404) including timing control for ejection of ink drops from its nozzles. As such, the electronic controller (402) operates on the data to define a pattern of ejected ink drops that form characters, symbols, and/or other graphics or images on the print media. Timing control and, therefore, the pattern of ejected ink drops, is determined by the print job commands and/or command parameters. In some examples, logic and drive circuitry forming a portion of electronic controller (402) is located on the fluid ejection assembly (404). In some examples, at least some of this logic and drive circuitry is located remotely from the fluid ejection assembly (404).

In one example, as shown in FIG. 4, the fluid ejection device (400) also includes the wiping assembly (100). The wiping assembly (100) is provided for performing periodic maintenance operations on the fluid ejection assembly (404) as described above. In one example, the wiping assembly (100) is stationary and the fluid ejection assembly (404) is moved to position at least the fluid ejection assembly (404), and in particular its nozzles, into wiping relation to the wiping assembly (100). In this example, the fluid ejection assembly (404) may include a carriage assembly for moving the fluid ejection assembly (404) into a servicing position, among other possible locations.

In some examples, the fluid ejection assembly (404) is stationary and the wiping assembly (100) is moved into wiping relation to at least the nozzles of the fluid ejection assembly (404). In these examples, the wiping assembly (100) acts as a sled that moves into a servicing position relative to the fluid ejection assembly (404). In another example, both the fluid ejection assembly (404) and the wiping assembly (100) are movable with respect to each other.

In some examples, whether the wiping assembly (100) is stationary, the fluid ejection assembly (404) is stationary, or both the wiping assembly (100) and the fluid ejection assembly (404) are both movable relative to each other, the wiping assembly (100) is selectively urged toward at least the nozzles of the fluid ejection assembly (404) and into biased contact against each other during a wiping action relative to the nozzles. In one example, a biasing force is provided via at least one spring such that contact of portion of the wiping assembly (100) relative to the fluid ejection assembly (404) results in the spring urging the wiping assembly (100) and the fluid ejection assembly (404) against each other.

As described above, the wiping assembly (100) includes an indicator (102) to apply tension on the wiping material within the wiping assembly (100) that is used to wipe the fluid ejection assembly (404).

In one example, the electronic controller (402) includes at least one processor and associated memories to generate control signals directing operation of at least some components of the fluid ejection device (400). In response to or based upon commands from a user interface (420) and/or machine readable instructions (including software) contained in the memory associated with the electronic controller (402), the electronic controller (402) generates control signals directing operation of the fluid ejection device (400).

In reference to the electronic controller (402), the term "processor" shall mean a presently developed or future developed processor (or processing resources) that executes sequences of machine readable instructions (such as but not limited to software) contained in a memory. Execution of the sequences of machine-readable instructions causes the processor to perform actions, such as operating the fluid ejection device (400) to cause the wiping assembly (100) to be properly tensioned and to wipe a portion of the fluid ejection assembly (404), in the manner described in the examples of the present disclosure. The machine-readable instructions may be loaded in a random access memory (RAM) for execution by the processor from their stored location in a read only memory (ROM), a mass storage device, or some other persistent storage or non-volatile form of memory. In one example, the memory includes a computer readable medium providing non-volatile storage of the machine-readable instructions executable by a process of the electronic controller (402). In other examples, hard-wired circuitry may be used in place of or in combination with machine-readable instructions (including software) to implement the functions described herein. For example, the electronic controller (402) may be embodied as part of at least one application-specific integrated circuit (ASIC). In one example, the electronic controller (402) is not limited to any specific combination of hardware circuitry and machine-readable instructions (including software), nor limited to any particular source for the machine-readable instructions executed by the electronic controller (402).

In one example, in cooperation with the electronic controller (402) and memory, the user interface (420) includes a graphical user interface or other display that provides for the simultaneous display, activation, and/or operation of various components, functions, features, and modules of the fluid ejection device (400).

A service module (408) may also be included in the fluid ejection device. In one example, the service module (408) includes a wiping function (410) to control wiping operations via the wiping assembly (100). The service module (408) may also include a position function (411) to control the positioning of the wiping assembly (100) and the fluid ejection assembly (404) relative to each other. The service module (408) may further include a tension function (412) to control operation of, for example, the spooling of wiping material from the supply roller (120), past the applicator assembly (126), through the pinch drive shaft (128) and an associated pinch idler shaft (134), and onto the take up reel (122), and to control a number of other elements of the wiping assembly (100) that may affect tension within the wiping material.

The fluid ejection device (400) further includes the wiping assembly position determination unit (414). As described above, the position determination unit (414) determines the position of the wiping assembly (100) relative to the horning surface (310) in order to determine if the distance between the horning surface (310) and the wiping assembly (100) has changed relative to an initial position defined by distance A depicted in FIG. 3A to another distance such as distances B or C depicted in FIGS. 3B and 3C, respectively. This change in distance is identified by the position determination unit (414). In one example, the position determination unit (414) determines that the position of the wiping assembly (100) between maintenance processes has changed and that the wiping assembly is unable to return to the initial position identified by distance A of FIG. 3A. A number of notifications may be sent by the position determination unit (FIG. 4, 414) to the electronic controller (FIG. 4, 402) of the fluid ejection device (FIG. 4, 400). The notifications identify corresponding level of wiping material consumption including any level between 0% and 100% consumption. These notifications may be presented to a user of the fluid ejection device (FIG. 4, 400) via the user interface (420) to notify the user of the level of wiping material consumption within the wiping assembly (100). The notification may also be translated or calculated by, for example, the electronic controller (402) and/or the position determination unit (414) into the number of remaining wipes before complete consumption of the wiping material, the number of pages that may be printed before complete consumption of the wiping material, the amount of time remaining before complete consumption of the wiping material, other usable information indicating a level of consumption of the wiping material, or combinations thereof.

Figure 5:
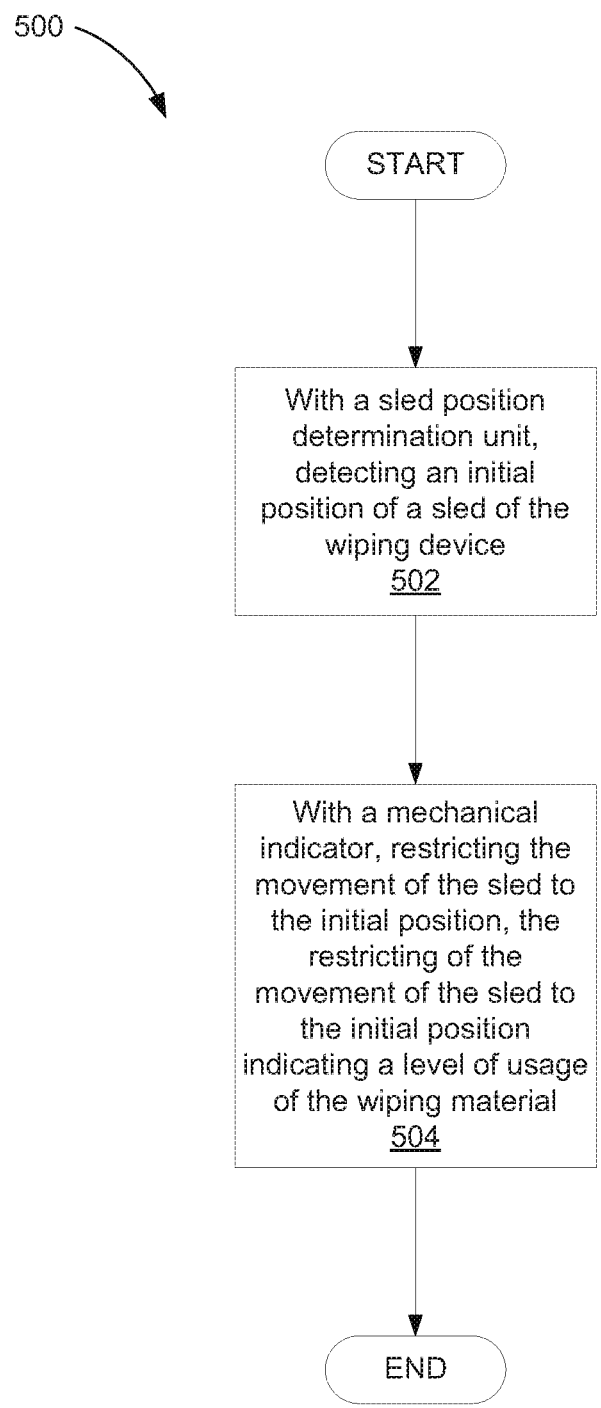
FIG. 5 is a flowchart showing a method of detecting usage of a wiping material with a wiping assembly, according to one example of the principles described herein.

FIG. 5 is a flowchart showing a method (500) of detecting usage of a wiping material with a wiping assembly (100), according to one example of the principles described herein. The method may begin by detecting (block 502) with a sled position determination unit, an initial position of a sled of the wiping assembly (100). The method may further include restricting (block 504), with a mechanical indicator, the movement of the sled (100) to the initial position. In one example, the restricting of the movement of the sled to the initial position indicates a level of usage of the wiping material.

Further, in one example, the mechanical indicator (102) restricts the movement of the sled to the initial position by engaging a number of the flanges (112-1, 112-2) of the arms (104-1, 104-2) of the mechanical indicator (102) with a number of detents (FIGS. 3A through 3C, 302-1, 302-2, 304-1, 304-2) defined within the wiping assembly (100). As described above and during the phase of wiping material usage depicted in FIG. 3A, the arms (104-1, 104-2) freely move within the arm channels (306-1, 306-2) without engagement with a number of detents (302-1, 302-2, 304-1, 304-2) defined within the cover (310). At the same time, the flag portion (110) of the indicator (102) freely extends from and retracts into the cover (310). At this stage of deployment of the indicator (102), the flag portion (110) abuts a homing surface (360), but does not keep the wiping assembly (100) from moving or returning to an initial position it was in when the wiping assembly (100) was new, and the supply roller (120) was completely full of wiping material. Further, as described above, the engagement of the flanges (112-1, 112-2) causes the flag portion (110) of the mechanical indicator (102) to unretractably protrude from the cover (310) of the sled (100) and abut the homing surface (360). The protrusion of the flag portion (110) defines the position of the sled (100) relative to the homing surface (360). In one example, a number of signals indicating a number of levels of wiping material usage may be sent to the electronic controller (402) via the sled position determination unit (414).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the electronic controller (402), the service module (408), the position determination unit (414), other element of the fluid ejection device (400), or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a wiping assembly for a fluid ejection device includes a sled slidably movable relative to the fluid ejection device. The wiping assembly further includes a length of wiping material. An indicator slidably coupled to the wiping assembly is included. The indicator changes position relative to the wiping assembly and restricts movement of the wiping assembly to an initial position to indicate a level of usage of the wiping material. These wiping material usage indicators may have a number of advantages, including: (1) low cost in manufacturing and maintenance due to the mechanical nature of the indicators; (2) reduces or eliminates the possibility of premature replacement of a wiping assembly within a fluid ejection device; (3) provides a more accurate identification of wiping material usage relative to, for example, a system that utilizes torque detection techniques; (4) use of a relatively simpler algorithm as compared to an algorithm used in connection with an electronic sensor; and (5) use less space within the printing device compared to an electronic sensor device.

The preceding description has been presented to illustrate and describe examples of the principles described. This description is not intended to be exhaustive or to limit these principles to any precise form disclosed. Many modifications and variations are possible in light of the above teaching.

What is claimed is:

1. A wiping assembly for a fluid ejection device, comprising:
a sled slidably movable relative to the fluid ejection device;
a rotating shaft rotatably coupled to the sled;
a length of wiping material spooled around the rotating shaft; and
an indicator slidably coupled to the sled, the indicator changing position relative to the sled, the indicator abutting a homing surface based on an amount of the wiping material spooled around the rotating shaft,
wherein the indicator comprises:
at least one arm, the at least one arm biased in a direction of a number of detents defined within the sled,
wherein the at least one arm, when engaged with the detents, restricts movement of the indicator in a direction opposite of a first direction at which a radii of the spooled wiping material decreases due to consumption of the wiping material.

2. The wiping assembly of claim 1, further comprising a first biasing member to bias the indicator in the first direction.

3. The wiping assembly of claim 1, further comprising a second biasing member to bias the at least one arm in the direction of the detents.

4. The wiping assembly of claim 1, further comprising:
a flag coupled to the indicator that:
protrudes outside a housing of the sled at a number of lengths based on the radii of the spooled wiping material; and
becomes a new homing surface when protruding from the housing and engaged into at least one of the detents.

5. The wiping assembly of claim 4, further comprising a sled position determination unit to determine the position of the sled relative to the homing surface,
wherein the arms of the indicator, when engaged with the detents, restrict the sled from moving to an initial position of the sled, the initial position being a position of the sled initially sensed by the sled position determination unit when an amount of wiping material between a maximum amount and a threshold amount less than the maximum amount of the wiping material is spooled around the rotating shaft.

6. The wiping assembly of claim 5, wherein the sled position determination unit transmits a number of notifications to a processor of a printing device in which the wiping assembly is embodied, the notifications indicating a level of use of the wiping material spooled around the rotating shaft.

7. The wiping assembly of claim 1, comprising:
   a tension appendage to apply tension to the wiping material spooled around the rotating shaft of the wiping assembly;
   at least one arm, the at least one arm biased in a direction of a number of detents defined within the sled to which the indicator is coupled; and
   a flange formed into the at least one arm, the flange to engage with the detents;
   wherein the at least one arm, when engaged with the detents, restricts movement of the indicator in a direction opposite of a first direction.

8. The wiping assembly of claim 7, wherein the first direction is a direction at which a radii of the spooled wiping material decreases due to consumption of the wiping material.

9. The wiping assembly of claim 7, wherein the tension appendage comprises a wheel to apply tension to the wiping material and to allow the wiping material to spool out.

10. The wiping assembly of claim 7, further comprising a biasing spring to bias the at least one arm in the direction of the detents to engage the flanges with the detents.

11. The wiping assembly of claim 7, further comprising a flag formed into the indicator,
   wherein the flanges, when engaged with the detents, restricts the mechanical indicator from moving in a direction opposite to the first direction,
   wherein the flag protrudes from a housing of the sled and increases the distance between the wiping assembly and a homing surface based on an amount of the wiping material spooled around the rotating shaft, and
   wherein the flag restricts the sled from moving to an initial position.

12. A method of operating the wiping assembly of claim 1 for detecting usage of the wiping material with the wiping assembly comprising:
   with a sled position determination unit, detecting an initial position of the sled of the wiping assembly;
   with a mechanical indicator, restricting movement of the sled to the initial position,
   wherein the restricting of the movement of the sled to the initial position indicates a level of usage of the wiping material.

13. The method of claim 12, wherein with the mechanical indicator, restricting the movement of the sled to the initial position comprises:
   engaging a number of flanges of a number of arms of the mechanical indicator with a number of detents defined within the sled,
   wherein the engagement of the flanges causes a flag portion of the mechanical indicator to unretractably protrude from a housing of the sled and abut a homing surface, and
   wherein the protrusion of the flag portion, when engaged into the detents defines the position of the sled relative to the homing surface.

14. The method of claim 12, further comprising, with the sled position determination unit, signaling a number of levels of wiping material usage to a processor of a printing device in which the wiping assembly is embodied.

* * * * *